Dec. 30, 1958 W. B. ZERN 2,866,271
MULTIPLE POINT STRAIGHT EDGE GAUGE
Filed Nov. 14, 1955 2 Sheets-Sheet 1
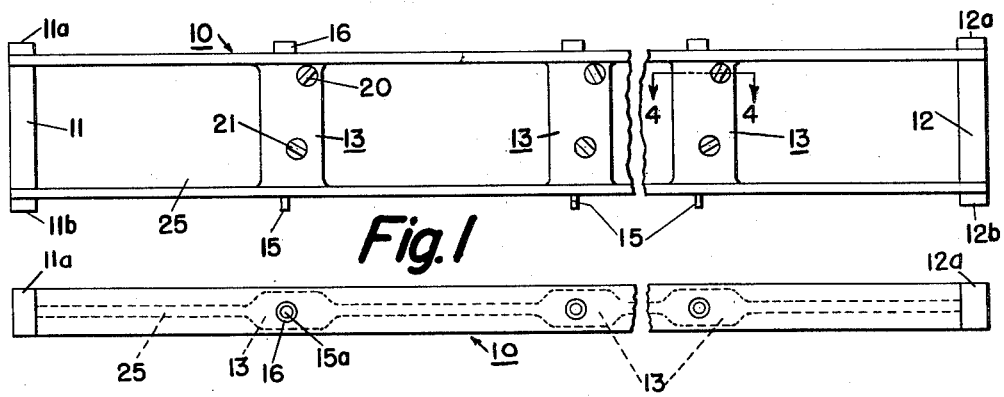
Fig.1
Fig.2
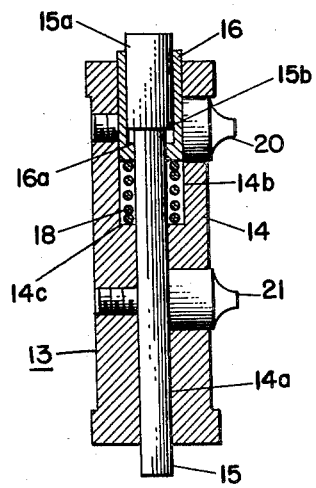
Fig.3
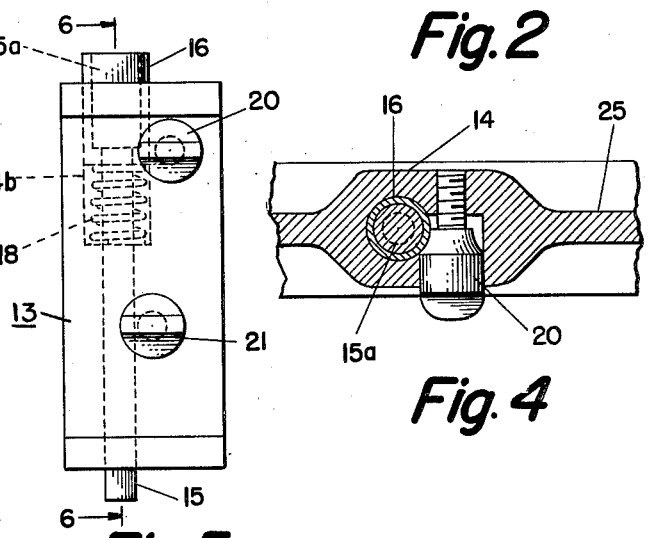
Fig.5
Fig.4
Fig.6

Dec. 30, 1958 W. B. ZERN 2,866,271
MULTIPLE POINT STRAIGHT EDGE GAUGE
Filed Nov. 14, 1955 2 Sheets-Sheet 2

United States Patent Office 2,866,271
Patented Dec. 30, 1958

2,866,271

MULTIPLE POINT STRAIGHT EDGE GAUGE

Warren B. Zern, near Pottstown, Pa.

Application November 14, 1955, Serial No. 546,545

10 Claims. (Cl. 33—174)

This invention relates to a straight edge gauge and has for an object the provision of a device for and method of determining whether the points along a surface lie in a straight line.

To determine whether or not a work surface or an edge thereof is straight, it is the usual practice to check such surface with a "straight edge" that has been made specifically for that purpose. Such straight edges are usually in the form of metal strips made in assorted lengths and machined as accurately as possible to provide a standard straight edge. Such straight edge gauges are necessarily expensive, and if they are dropped or otherwise roughly handled, their accuracy will likely be affected. In fact, it has been found by checking a number of straight edge tools with the hereinafter described device that such tools at best include substantial inaccuracies.

Accordingly, it is an object of the present invention to provide a straight edge gauge that will check a work surface to determine whether or not the surface is flat at points between the ends of the gauge and thus enable the operator to determine whether all of the points along the edge of the gauge lie in a straight line.

In accordance with the present invention, in one form thereof there is provided a straight edge gauge comprising a frame having a pair of members of equal length carried by the frame at spaced locations and at least another member of equal length carried by the frame intermediate the pair of members. The intermediate member has a slidable member of shorter length adjacent thereto with one end of the slidable member being adapted for alignment with the corresponding end of the intermediate member and means for independently locking the intermediate member and the slidable member to the frame.

Further in accordance with the invention, the slidable member may take the form of a collar surrounding the intermediate member and including means for biasing one end of the collar member toward the corresponding end of the intermediate member. Any number of intermediate members and associated slidable members may be utilized between the end members of the straight edge gauge depending upon the number of points to be checked along the work surface.

Further in accordance with the invention, there is provided a method of gauging a surface to determine whether points along a surface lie in a straight line comprising the steps of placing a gauge having a plurality of locating members along the surface, the intermediate locating members each having an adjacent slidable member adjustable in accordance with the contour of the surface between the end locating members. The method further includes the steps of locking the slidable members in position relative to the end locating members, inverting the gauge and adjusting the intermediate locating members relative to their adjacent slidable members in accordance with the contour of the surface between the end locating members, locking the intermediate locating members in their latter position, and thereafter moving the ends of the intermediate members toward the corresponding ends of the slidable members a distance corresponding to one-half of their separation distance whereby the remaining separation distance between the adjacent ends of the corresponding intermediate locating members and slidable members is equal to the deviation of the corresponding point of the surface from a straight line and whereby the corresponding ends of the end locating members and the intermediate locating members all lie in a straight line after the preceding adjustments.

For a more detailed disclosure of the invention and for further objects and advantages thereof, reference is to be had to the following description taken in conjunction with the accompanying drawings in which:

Fig. 1 is a front elevation, partly broken away, of a gauge embodying the invention;

Fig. 2 is a top plan view of the gauge shown in Fig. 1;

Fig. 3 is an enlarged end view of the gauge taken from the left-hand end in Fig. 2;

Fig. 4 is an enlarged sectional view taken along the plane 4—4 in Fig. 1;

Fig. 5 is an enlarged elevational view of one of the novel units making up the gauge;

Fig. 6 is a sectional view taken along the plane 6—6 in Fig. 5; and

Figure 7:
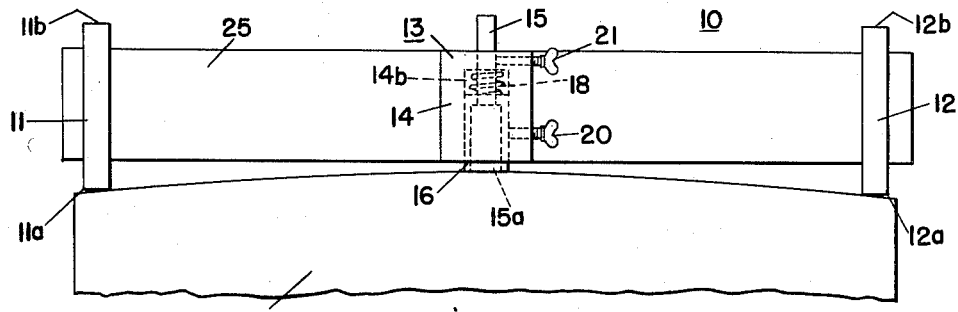
Figs. 7–10 are diagrammatic views useful in explaining the method embodying the present invention.

Referring to the drawings, there is shown in Fig. 1 a multiple point straight edge gauge 10 embodying the present invention. The gauge comprises a pair of end members 11 and 12 of equal length and one or more intermediate units 13. The units 13, Figs. 4–6, comprise a housing 14 having a passageway 14a extending therethrough and adapted slidably to receive a member or post 15 having the same over-all length as the pair of end members 11 and 12. Adjacent the member 15 is a slidable member 16 of shorter length illustrated in the form of a collar surrounding the enlarged end 15a of pin 15 and having an internal shoulder 16a adapted to be disposed opposite the external shoulder 15b on member 15. The passageway 14a through the housing 14 is enlarged at 14b to accommodate both the collar member 16 and the enlarged end 15a of member 15. Within section 14b of the passageway there is disposed a coil spring 18 which is adapted to have one of its ends engage a shoulder 14c within the passageway and to have its opposite end engage the slidable collar 16 to force the latter outwardly of the passageway along with the enlarged end 15a of member 15. As both the member 15 and the collar member 16 are slidable with respect to each other and with respect to the housing 14, there is provided means for locking members 15 and 16 independently with respect to the housing. To lock the collar member 16 to the housing 14, there is provided a threaded member 20 adapted to be received within a threaded opening in the housing 14 and having suitable structure for ease in turning such, for example, as a thumb screw, Allen cap screw or equivalent. A similar screw 21 is provided for securing the member 15 to the housing 14.

The pair of end members 11 and 12 and one or more of the intermediate units 13 may be interconnected by any suitable rigid means such as a bar of metal or a piece of wood or other rigid material. The end members 11 and 12 and the intermediate units 13 may be formed integral with the rigid interconnecting means or they may be separate members which in turn are secured to the interconnecting bar. As shown in Figs. 1 and 2, the end members 11 and 12 as well as the units 13 are integral components of a bar member 25 having the general configuration of an I-beam. It is preferable that the gauge 10 be as light in weight as possible for ease in handling, but sturdy enough to prevent spring or sag in its length. Thus the I-beam may be constructed from one of the lighter metals such, for example, as aluminum.

Each of the end members 11 and 12 has been illustrated as including a narrow end section of the I-beam 25 and at the top and bottom of the I-beam, as illustrated in Figs. 2 and 3, there are disposed locating pads 11a and 12a, 11b and 12b respectively forming the end locating surfaces for the multiple point straight edge gauge 10. As previously mentioned, the over-all distance from the top locating surface of pad 11a to the bottom locating surface of pad 11b, and similarly from the top surface of 12a to the bottom surface of 12b, is equal to the overall length of each of members 15. The purpose of this will hereinafter be pointed out. It will also be noted that the pair of end members 11 and 12 is disposed substantially parallel with respect to the members 15 within the intermediate units 13.

As previously pointed out, it is frequently important both in woodworking and metal working that work surfaces should be flat between given points, and thus it is necessary to determine whether all of the points along an edge lie in a straight line. While the invention is not limited thereto, its application will now be described in relation to the door hanging art. For example, in preparing doors for hanging, it is important that the edges of the door be substantially straight in order that the door will hang properly in a door frame having correspondingly straight sides. Accordingly, let it be assumed that the gauge 10 is placed on the edge of a door 30 to check whether or not the points along that door edge between the ends of the gauge, i. e. between end members 11 and 12, are in a common plane. Thus the operator will be able to determine whether any material needs to be removed from the door at various locations.

Figure 8:
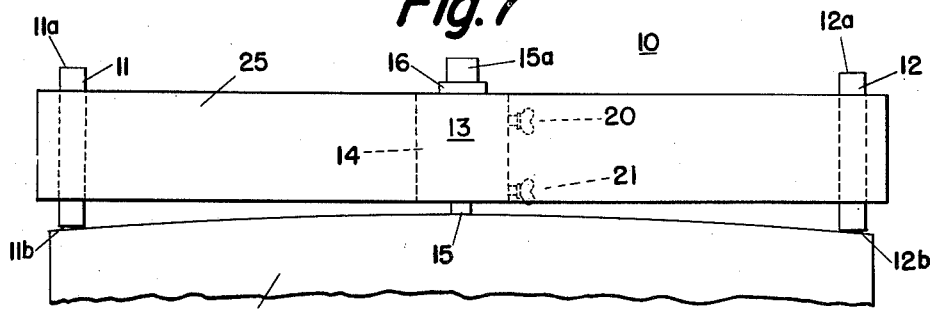

In describing the operation, it will first be assumed that the door 30 has a rise in the edge, as diagrammatically shown in Figs. 7 and 8, and thus the elevation of the portion of the door which engages the center unit 13 will be higher than the portions of the door 30 that engage the end members 11 and 12 of the gauge. The gauge 10 is placed on the edge of the door with the locating surfaces 11a and 12a and the enlarged end 15a of member 15 all in engagement with the door. As the slidable member 16 is spring biased outwardly of its chamber 14b by spring 18, the lower ends of both the collar member 16 and the member 15 will be held against the edge of the door, the latter by reason of the cooperation between the engaging shoulders 15b and 16a, Fig. 6, where the shoulders have been moved apart for clarity. The spring 18 in its uncompressed state preferably has sufficient length to force collar 16 out of the chamber 14b a distance sufficiently great to bring it into alignment with the locating surfaces 11a and 12a on members 11 and 12.

With the members 15 and 16 moved upwardly, Fig. 7, due to the raised portion on the edge of the door, the member 16 is then held in that position within the housing 14 by means of the clamping screw 20. The gauge 10 is then turned over, Fig. 8, so that the small end of member 15 is brought into engagement with the same point on the door edge that was previously engaged by collar member 16 and the large diameter end 15a of member 15. When gauge 10 is turned over, the member 15 will project above the end of collar member 16 an amount corresponding to twice the amount of material to be removed from that location on the door edge. The reason that the member 15 projects twice the amount of error is due to the fact that the collar member 16 was previously adjusted to compensate for one times the amount of error and when the gauge 10 is reversed, since member 15 has the same over-all length as end members 11 and 12, the member 15 projects beyond the end of collar member 16 and amount corresponding to twice the amount of error at that location on the door edge.

As the amount of error in the surface is magnified by a factor of two, this enables the operator quickly to locate the points along a surface that need further work to bring them into a straight line with the other points on the surface.

The members 15 are then lowered into their corresponding collars 16 one-half the distance that they presently project thereabove, at which time the ends 15a of members 15 and the corresponding ends 11a and 12a of end members 11 and 12 will all lie on a straight line. Likewise, the opposite end of members 15 along with surfaces 11b and 12b of end members 11 and 12 will also lie on a straight line. To aid in this adjustment, the members 15 may be provided with scale markings and/or a depth gauge or caliper may be used. To maintain this straight line relationship between the intermediate members 15 and the end members 11 and 12, the members 15 are now locked in position with respect to their housings by suitable means such, for example, as the associated thumb screws 21. The distance between the exposed end of collar member 16 and the adjacent end 15a of member 15 will indicate the amount of material that is to be removed at the corresponding location on the edge of the door. After that amount has been removed from the edge of the door, the three points of the door edge that are engaged by the corresponding ends of members 11, 12 and 15 will all lie along a straight line passing through these three points.

Figure 9:
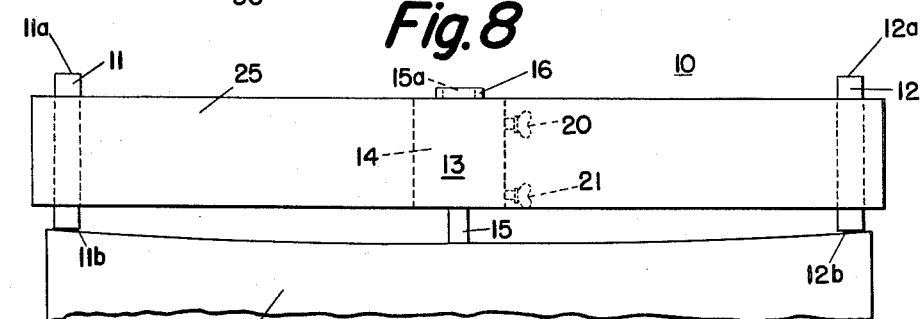
Figure 10:
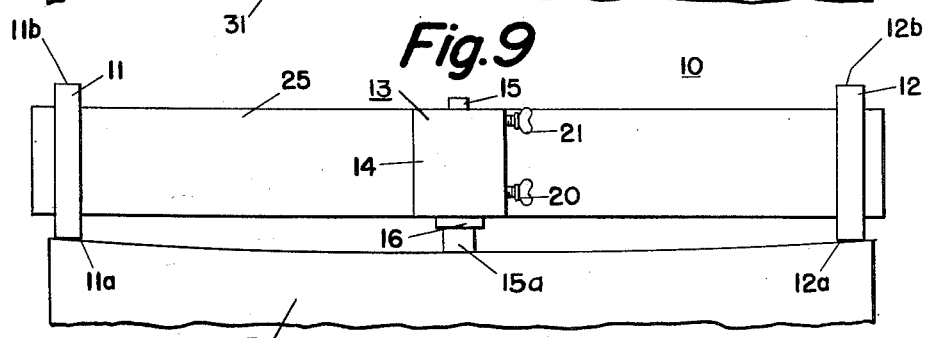

The foregoing description of operation has been concerned primarily with gauging the edge of a door 30 that has a rise between the end point locations. In gauging a door edge 31 that has a hollow between the end point locations, the gauge 10 preferably is first placed on the door edge with the small end of the intermediate member 15 projecting downwardly as in Fig. 9. The upper ends of both the collar member 16 and the enlarged end 15a of member 15 are pushed downwardly until the small diameter end of member 15 engages the hollow surface of the door edge. As may be seen in Fig. 5, the exposed end of collar member 16 and enlarged end 15a of member 15 are in alignment, and thus the two may be pushed downwardly concurrently. At this time the abutting shoulders 15b and 16a will likewise be in engagement. During the aforesaid downward movement, the spring 18 will be compressed, and thus in order to hold collar member 16 in its depressed position, it is necessary to lock it to the housing 14 by means of thumb screw 20. The gauge 10 is then inverted and the small end of member 15 is pushed downwardly until the large diameter end 15a of member 15 engages the hollow portion of the door edge 31. The thumb screw 21 is then tightened to hold the member 15 in place.

With the gauge 10 adjusted in the foregoing manner, the distance between the end of collar 16 and the enlarged end 15a of member 15 will indicate twice the depth of the hollow in the door edge. This distance may be accurately measured by any suitable means such as a depth gauge or caliper. The thumb screw 21 may then be loosened and the pin 15 moved within the collar member 16 one-half the distance that it projected therefrom. Thus the final portion of the enlarged end 15a of member 15 with respect to the end of the collar member 16 will correspond to the depth of the hollow and thus indicate the amount of material that should be removed adjacent the hollow to make the edge of the door flat. At this time the enlarged end 15a of member 15 and the corresponding ends 11a and 12a of end members 11 and 12 will all lie in a straight line, and there will have been constructed, in similar manner to that earlier described, a gauge forming a multiple point straight edge. Thus, when the edge of the door has been planed sufficiently to bring all of these points into concurrent engagement with the edge of the gauge, it will be assured that those points along the edge of the door will be in a straight line.

By utilizing additional intermediate units 13 or by moving the same unit 13 to different locations between the end members 11 and 12, any point or points between the end members 11 and 12 may be checked to insure that such points are in a straight line with the points engaged by end members 11 and 12. As previously mentioned, the adjustable unit 13 has been shown in Figs. 1 and 2 as being mounted in a housing 14 formed integral with the bar 25 of gauge 10. It will, of course, be understood that the unit 13 may itself include the housing 14 as a separate unit, Figs. 5–10.

It will further be understood that the end members 11 and 12 may be removable units and that they may attached to any suitable bar or similar member or formed integral therewith. The end surfaces 11a, 11b and 12a, 12b thereof may be in the form of knife edge surfaces extending transversely of the gauge or preferably small flat areas as illustrated. The length of the bar 25 may be of any suitable length, as desired, depending upon the size of the work which is being gauged and the material from which the bar 25 is formed. Aluminum has proved to be a very satisfactory material for the bar due to its light weight and rigidity, thus making for easy handling of the gauge. In one application the gauge was formed from an aluminum I-beam with the housings for the intermediate units 13 cast integral therewith. The length of the gauge was forty-eight inches with units 13 being disposed at six-inch intervals between the ends of the gauge. The intermediate members 15 were made from steel as were the corresponding collar members 16.

The foregoing invention provides a multiple point straight edge for gauging the straightness of a work surface which is easy to operate and permits the operator to obtain a maximum of accuracy in his work. The gauge not only is capable of indicating the amount of material to be removed to bring all of the points along a particular edge into alignment, but by operation of the gauge in the foregoing described manner, the operator will have constructed a straight edge having a plurality of points, the number of which may vary as desired, all lying in a straight line. As each time the gauge is used the operator constructs his own straight edge, there is no danger that the gauge may be inaccurate due to previous mishandling. Thus the present invention provides a multiple point straight edge that will insure high accuracy and at a substantial saving of the costs ordinarily involved in manufacturing straight edges of the type used heretofore.

While there has been described a preferred embodiment of the invention, it will be understood that further modifications may be made without departing from the spirit and scope of the invention as set forth in the appended claims.

What is claimed is:

1. A straight edge gauge comprising a frame having a pair of members of equal length carried by said frame at spaced locations, at least another member of equal length carried by said frame intermediate said pair of members, all of said members being parallel with said intermediate member positioned so that its ends are movable through planes defined by said pair of outer members, said intermediate member having a collar member slidably disposed thereon and of shorter length, one end of said collar member being adapted for alignment with the corresponding end of said intermediate member, and means for independently locking said intermediate member and said collar to said frame.

2. A straight edge gauge according to claim 1 including means for biasing said one end of said collar member toward said corresponding end of said intermediate member.

3. A straight edge gauge comprising a frame having at each of two spaced locations a pair of locating faces spaced apart equal distances, a locating member slidably carried by said frame between said two spaced locations, the over-all length of said locating member being equal to said equal distances between said locating faces of each pair, a slidable member disposed closely adjacent said locating member and having a length shorter than said locating member, said slidable member having a locating end adapted for movement into and out of alignment with a corresponding end of said locating member, and means for independently locking said locating member and said slidable member with respect to said frame.

4. A gauge for locating the position of a plurality of points and for indicating the deviation of said points from a straight line comprising a pair of elements of equal length, a member having the same length as one of said elements, means rigidly interconnecting said pair of elements and said member in parallel relation with their respective ends lying along two parallel lines substantially perpendicular to said member, said member being disposed between said elements and slidable within a housing carried by said interconnecting means, a slidable member adjacent said first-named member and having a length shorter than said first-named member, one end of said slidable member being adapted for movement into and out of alignment with the corresponding end of said first-named member, and means for locking said slidable member and said first-named member in selected positions relative to each other and to said interconnecting means.

5. A gauge according to claim 4 wherein said first-named member, said housing, said slidable member and said locking means comprise a unit and a plurality of said units are disposed between said pair of elements.

6. The method of gauging a surface to determine whether points along the surface lie in a straight line comprising the steps of placing a gauge having a plurality of locating members along said surface, the intermediate locating members each having an adjacent slidable member adjustable in accordance with the contour of the surface between the end locating members, locking the slidable members in position relative to the end locating members, inverting the gauge and adjusting the intermediate locating members relative to their adjacent slidable members in accordance with the contour of the surface between the end locating members, locking the intermediate locating members in their latter positions, and moving the ends of the intermediate members toward the corresponding ends of the slidable members a distance corresponding to one-half of their separation distance whereby the remaining separation distance between the adjacent ends of the corresponding intermediate locating members and slidable members is equal to the deviation of the corresponding point of the surface from a straight line and whereby the corresponding ends of the end locating members and the intermediate locating members all lie in a straight line after said preceding adjustments.

7. The method of gauging a surface to determine whether points along the surface lie in a straight line comprising the steps of placing a gauge having a plurality of locating members along said surface, the intermediate locating member having an adjacent slidable member adjustable in accordance with the contour of the surface between the end locating members, locking the slidable member in position relative to the end locating members, inverting the gauge and adjusting the intermediate locating member relative to its adjacent slidable member in accordance with the contour of the surface between the end locating members, locking the intermediate locating member in its latter position, and moving the end of the intermediate member toward the corresponding end of the slidable member a distance corresponding to one-half of their separation distance whereby the remaining separation distance between the adjacent ends of the corresponding intermediate locating member and slidable member is equal to the deviation of the corresponding point of the surface from a straight line and whereby the corresponding ends of the end locating members and the intermediate locating member all lie in a straight line after said preceding adjustments.

8. A multiple point straight edge gauge comprising a pair of end members of equal length and at least one intermediate unit, all carried at spaced locations along a rigid member, said unit comprising a housing having a passageway extending therethrough, an intermediate member adapted to be slidably received within said passageway and having the same over-all length as said pair of end members and parallel thereto, said intermediate member having an enlarged end with an external shoulder, a collar on said enlarged end and having an internal shoulder adapted to be disposed adjacent said external shoulder, said collar being shorter than said intermediate member, said passageway having an enlarged section to accommodate both said collar and said enlarged end of said intermediate member, biasing means disposed within said enlarged portion of said passageway between said housing and said collar and adapted to force the latter outwardly of said passageway along with said enlarged end of said intermediate member, and means for locking said collar and said intermediate member independently with respect to said housing.

9. In a multiple point straight edge device, the subcombination comprising a housing having a passageway extending therethrough, a member adapted to be slidably received within said passageway and having a length greater than said passageway, said member having an enlarged end with an external shoulder, a collar surrounding said enlarged end and having an internal shoulder adapted to be disposed adjacent said external shoulder, said collar being shorter than said member, said passageway having an enlarged section to accommodate both said collar and said enlarged end of said member, biasing means disposed within said enlarged portion of said passageway between said housing and said collar and adapted to force the latter outwardly of said passageway along with said enlarged end of said member, and means for locking said collar and said member independently with respect to said housing.

10. In a multiple point straight edge device, the subcombination comprising a housing having a passageway extending therethrough, a member adapted to be slidably received within said passageway and having a length greater than said passageway, said member having an enlarged end with an external shoulder, a reference member within said housing slidable along said enlarged end and having structure adapted to engage said external shoulder, the length of said enlarged end of said member corresponding to the distance between the corresponding end of said reference member and said structure thereon for engaging said shoulder, said passageway having an enlarged section to accommodate both said reference member and said enlarged end of said member, biasing means disposed within said enlarged portion of said passageway between said housing and said reference member and adapted to force the latter outwardly of said passageway along with said enlarged end of said member, and means for locking said members independently with repsect to said housing.

References Cited in the file of this patent
UNITED STATES PATENTS

| 1,093,867 | Legare | Apr. 21, 1914 |
| 2,175,650 | Schaber | Oct. 10, 1939 |
| 2,295,447 | Bierman | Sept. 8, 1942 |
| 2,401,085 | Valley | May 28, 1946 |
| 2,547,647 | Levesque | Apr. 3, 1951 |

FOREIGN PATENTS

| 167,248 | Great Britain | Aug. 2, 1921 |
| 1,042,956 | France | Nov. 5, 1953 |